(12) United States Patent
Miyajima et al.

(10) Patent No.: US 10,961,068 B2
(45) Date of Patent: Mar. 30, 2021

(54) SHEET CONVEYING APPARATUS

(71) Applicant: Konica Minolta, Inc., Tokyo (JP)

(72) Inventors: Satoshi Miyajima, Hino (JP);
Takanobu Shiki, Sagamihara (JP);
Tadayuki Ueda, Kokubunji (JP);
Hiroshi Oyama, Hino (JP); Remi Ishikawa, Mitaka (JP)

(73) Assignee: Konica Minolta, Inc., Tokyo (JP)

( * ) Notice: Subject to any disclaimer, the term of this patent is extended or adjusted under 35 U.S.C. 154(b) by 192 days.

(21) Appl. No.: 15/970,447

(22) Filed: May 3, 2018

(65) Prior Publication Data

US 2018/0334341 A1    Nov. 22, 2018

(30) Foreign Application Priority Data

May 17, 2017    (JP) .............................. JP2017-098388

(51) Int. Cl.
*B65H 5/06* (2006.01)
*B41J 15/04* (2006.01)
(Continued)

(52) U.S. Cl.
CPC .......... *B65H 5/062* (2013.01); *B41J 13/0009* (2013.01); *B41J 15/042* (2013.01);
(Continued)

(58) Field of Classification Search
CPC .......... B65H 5/06; B65H 5/062; B65H 5/064; B65H 9/004; B65H 9/006; B65H 9/008; B65H 9/14; B65H 15/00; B65H 29/12; B65H 29/125; B65H 85/00; B65H 2403/732; B65H 2403/943; B65H 2403/944; B65H 2404/16;
(Continued)

(56) References Cited

U.S. PATENT DOCUMENTS 6,530,569 B2 *    3/2003    Yamagishi ............. B65H 5/062
                                                             271/270
7,971,878 B2 *    7/2011    Hashimoto ........ G03G 15/0131
                                                             198/624
(Continued)

FOREIGN PATENT DOCUMENTS

JP        2001-270180        10/2001

OTHER PUBLICATIONS

First Office Action dated Jun. 3, 2019, in Chinese Patent Application No. 201810447334.1, 21 pages.

*Primary Examiner* — Howard J Sanders
(74) *Attorney, Agent, or Firm* — Squire Patton Boggs (US) LLP

(57) ABSTRACT

A sheet conveying apparatus includes: a plurality of driving parts each connected to one end of corresponding one of a respective plurality of rotating shafts; a first torque adjuster connected to another end of each of the plurality of rotating shafts, the first torque adjuster applying first torque to the plurality of driving parts; a second torque adjuster that applies, to the driving parts, second torque for adjusting the first torque to be applied to the driving parts by the first torque adjuster; and a hardware processor that controls the second torque to be applied to the driving parts in the second torque adjuster in accordance with a number of revolutions of the driving part.

6 Claims, 5 Drawing Sheets

(51) Int. Cl.
*B41J 13/00* (2006.01)
*F16D 13/00* (2006.01)
*G03G 15/00* (2006.01)
*B65H 7/06* (2006.01)

(52) U.S. Cl.
CPC ............... *B65H 7/06* (2013.01); *F16D 13/00* (2013.01); *G03G 15/50* (2013.01); *G03G 15/6529* (2013.01); *B65H 2403/943* (2013.01); *B65H 2403/944* (2013.01); *B65H 2511/33* (2013.01); *B65H 2515/322* (2013.01); *B65H 2555/25* (2013.01); *B65H 2555/26* (2013.01); *B65H 2801/06* (2013.01); *G03G 2215/00679* (2013.01); *G03G 2221/1657* (2013.01)

(58) Field of Classification Search
CPC ........ B65H 2404/162; B65H 2404/165; B65H 2404/166; B65H 2515/32; B65H 2515/322; B65H 2555/24; B65H 2555/25; B65H 2555/252; B65H 2555/26
See application file for complete search history.

(56) References Cited

U.S. PATENT DOCUMENTS

| | | | | |
|---|---|---|---|---|
| 8,364,071 | B2* | 1/2013 | Noguchi | B65H 5/062 |
| | | | | 399/397 |
| 8,678,372 | B2* | 3/2014 | Yasukawa | B65H 7/12 |
| | | | | 271/10.09 |
| 8,827,258 | B2* | 9/2014 | Miki | G03G 15/6529 |
| | | | | 271/264 |
| 9,617,096 | B2* | 4/2017 | Kii | B65H 7/00 |
| 10,435,261 | B2* | 10/2019 | Miyajima | G03G 15/80 |
| 10,526,150 | B2* | 1/2020 | Miyajima | B65H 7/06 |
| 2007/0284803 | A1* | 12/2007 | Oomori | B65H 3/0669 |
| | | | | 271/10.01 |

* cited by examiner

SHEET CONVEYING APPARATUS

The entire disclosure of Japanese patent Application No. 2017-098388, filed on May 17, 2017, is incorporated herein by reference in its entirety.

BACKGROUND

Technological Field

The present invention relates to a sheet conveying apparatus.

Description of the Related Art

Conventionally, printers employing an electrophotographic method and image forming apparatuses such as copying machines are widely used. The image forming apparatus includes a plurality of conveying rollers for conveying a sheet, and for example, a stepping motor is widely used as a driving source of each conveying roller. Generally, it is known that stepping motors have torque shortages on the whole at the time of high-speed driving (rotation) or the like.

Therefore, as a method of supplementing driving torque of the stepping motor, for example, a method has been devised of arranging one assist motor for one stepping motor. JP 2001-270180 A describes a carriage driving method in which a carriage is driven by a combination of a stepping motor and a direct current motor in a printer that performs printing on a recording medium while the carriage reciprocates.

However, in a case where there is a plurality of stepping motors and the assist motor is assigned to each of the stepping motors for driving, there is a possibility that variations occur in control (timing) between the assist motors. In such a case, variations also occur in assist amounts applied to the plurality of stepping motors, and there has been a problem that synchronous control cannot be implemented between the stepping motors.

As a method of performing synchronous control between the plurality of stepping motors, a configuration has been devised in which assist control of the plurality of stepping motors is performed by, for example, a single assist motor. With this configuration, the assist amounts can be made the same amount between the plurality of stepping motors, so that synchronization can be achieved between the plurality of stepping motors.

However, synchronous control of a motor, for example, a stepping motor, in the conventional image forming apparatus has the following problem. That is, in the conventional synchronous control of the stepping motor, even in a case where the motor type differs or the load of the rotating shaft or the sheet differs, uniform (the same amount) assist torque is applied to each of the plurality of stepping motors. For that reason, among the plurality of stepping motors, in some cases, a motor is included to which an excessive assist torque is applied at the time of startup, and there has been a problem that step-out of the stepping motor occurs.

SUMMARY

The present invention has been made in view of the above problem, and it is an object of the present invention to provide a sheet conveying apparatus capable of reliably preventing step-out of a motor in a case where assist control is performed of a plurality of motors having different motor types and different driving loads.

To achieve the abovementioned object, according to an aspect of the present invention, a sheet conveying apparatus reflecting one aspect of the present invention comprises: a plurality of driving parts each connected to one end of corresponding one of a respective plurality of rotating shafts; a first torque adjuster connected to another end of each of the plurality of rotating shafts, the first torque adjuster applying first torque to the plurality of driving parts; a second torque adjuster that applies, to the driving parts, second torque for adjusting the first torque to be applied to the driving parts by the first torque adjuster; and a hardware processor that controls the second torque to be applied to the driving parts in the second torque adjuster in accordance with a number of revolutions of the driving part.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more preferred embodiments of the present invention will be described in detail with reference to the drawings. However, the scope of the invention is not limited to the disclosed embodiments. Dimensional ratios of the drawings are extended for convenience of description, and may be different from actual ratios.

Configuration Example of Image Forming Apparatus 100

Figure 1:
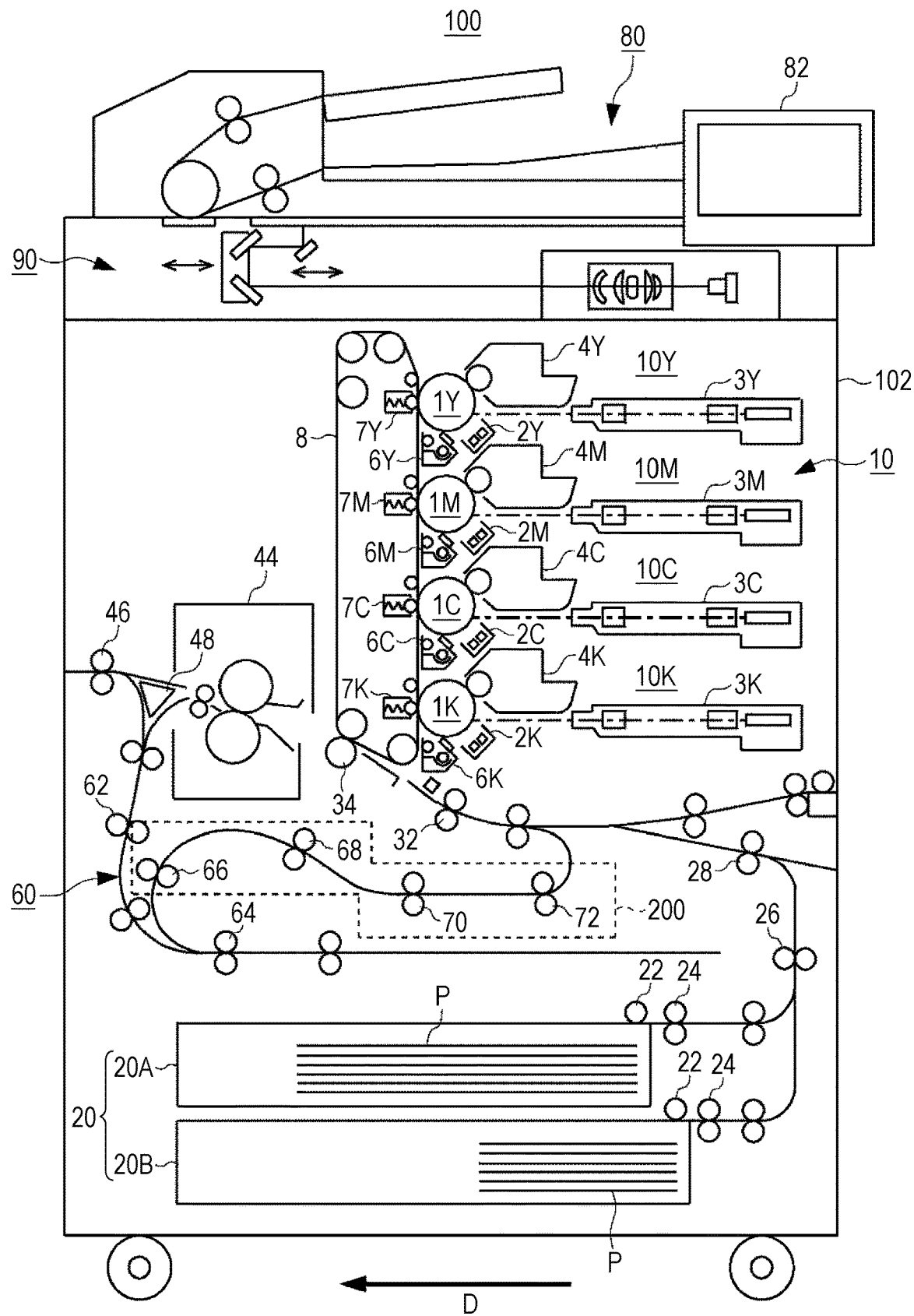
FIG. 1 is a diagram illustrating a configuration example of an image forming apparatus according to an embodiment of the present invention.

FIG. 1 illustrates an example of a configuration of an image forming apparatus 100 according to the present invention. The image forming apparatus 100 illustrated in FIG. 1 forms a color image; however, the present invention is not limited to the image forming apparatus that forms the color image, but may also be applied to an image forming apparatus that forms a monochrome image.

As illustrated in FIG. 1, the image forming apparatus 100 is referred to as a tandem type image forming apparatus, and includes an automatic document conveying unit 80 and an apparatus main body 102. The automatic document conveying unit 80 is attached to the upper part of the apparatus main body 102 and feeds a sheet set on a conveying table to an image reading unit 90 of the apparatus main body 102 by a conveying roller and the like.

The apparatus main body 102 includes an operation display unit 82, the image reading unit 90, an image forming part 10, an intermediate transfer belt 8, a sheet feeding unit 20, a registration roller 32, a fixing unit 44, an automatic sheet reverse conveying unit 60 (Auto Duplex Unit, hereinafter referred to as ADU), and a driving mechanism 200.

The operation display unit 82 includes a touch screen in which a display unit and an input unit are combined together, and a plurality of operation keys including a start key and a decision key provided in the periphery of the touch screen. The operation display unit 82 displays a menu screen or the like on the screen, and accepts information such as image forming conditions input by touch operation on the menu screen or operation of the operation keys.

The image reading unit 90 performs scanning exposure of a document placed on a document table or a document conveyed by the automatic document conveying unit 80, by an optical system of a scanning exposure apparatus, and performs photoelectric conversion of an image of the document scanned by a Charge Coupled Device (CCD) image sensor to generate an image information signal. The image information signal is subjected to analog processing, analog/digital (hereinafter referred to as A/D) conversion processing, shading correction, image compression processing, and the like by an image processing unit (not illustrated), and then is output to the image forming part 10.

The image forming part 10 forms an image by an electrophotographic method, and includes an image forming unit 10Y that forms a yellow (Y) color image, an image forming unit 10M that forms a magenta (M) color image, an image forming unit 10C that forms a cyan (C) color image, and an image forming unit 10K that forms a black (K) color image. In this example, description will be made such that Y, M, C, and K indicating the colors to be formed are added behind common function names, for example, the reference numeral 10.

The image forming unit 10Y includes a photosensitive drum 1Y, a charger 2Y arranged around the photosensitive drum 1Y, an exposure unit (optical writing unit) 3Y, a developing unit 4Y, and a cleaning unit 6Y. The image forming unit 10M includes a photosensitive drum 1M, a charger 2M arranged around the photosensitive drum 1M, an exposure unit 3M, a developing unit 4M, and a cleaning unit 6M. The image forming unit 10C includes a photosensitive drum 1C, a charger 2C arranged around the photosensitive drum 1C, an exposure unit 3C, a developing unit 4C, and a cleaning unit 6C. The image forming unit 10K includes a photosensitive drum 1K, a charger 2K arranged around the photosensitive drum 1K, an exposure unit 3K, a developing unit 4K, and a cleaning unit 6K.

In the image forming units 10Y, 10M, 10C, and 10K, the respective photosensitive drums (image carriers) 1Y, 1M, 1C, and 1K, chargers 2Y, 2M, 2C, and 2K, exposure units 3Y, 3M, 3C, and 3K, developing units 4Y, 4M, 4C, and 4K, cleaning units 6Y, 6M, 6C, and 6K, and primary transfer rollers 7Y, 7M, 7C, and 7K each have a common configuration. Hereinafter, except in a case where distinction is particularly necessary, notations Y, M, C, and K are not attached.

The charger 2 charges the surface of the photosensitive drum 1 substantially uniformly. The exposure unit 3 includes an LED Print Head (LPH) including, for example, an LED array and an imaging lens, and a polygon mirror type laser exposure scanning apparatus, and performs scanning with laser light on the photosensitive drum 1 on the basis of the image information signal to form an electrostatic latent image. The developing unit 4 develops the electrostatic latent image formed on the photosensitive drum 1 with toner. As a result, a toner image that is a visible image is formed on the photosensitive drum 1.

The intermediate transfer belt 8 is stretched by a plurality of rollers and rotatably supported. In conjunction with rotation of the intermediate transfer belt 8, the primary transfer roller 7 and the photosensitive drum 1 are rotated, and a predetermined voltage is applied between the primary transfer roller 7 and the photosensitive drum 1, whereby the toner image formed on the photosensitive drum 1 is transferred onto the intermediate transfer belt 8 (primary transfer).

The sheet feeding unit 20 includes a plurality of sheet feeding trays 20A and 20B in which a sheet P such as A3 or A4 is accommodated. The sheet P conveyed from each of the sheet feeding trays 20A and 20B by conveying rollers 22, 24, 26, 28, and the like is conveyed to the registration roller 32. The number of sheet feeding trays is not limited to two. In addition, one or a plurality of large capacity sheet feeding apparatuses capable of accommodating a large number of sheets P may be connected as necessary.

The registration roller 32 corrects the turning of the sheet P and corrects the deviation. The sheet P whose turning or the like is corrected is conveyed to a secondary transfer roller 34 in accordance with conveying timing of the toner image transferred to the intermediate transfer belt 8. In the secondary transfer roller 34, Y, M, C, and K toner images transferred onto the intermediate transfer belt 8 are collectively transferred onto the surface of the sheet P (secondary transfer). The secondarily transferred sheet P is conveyed to the fixing unit 44 on the downstream side in a conveying direction D.

The fixing unit 44 includes a pressure roller and a heating roller. The fixing unit 44 performs pressing and heating processing on the sheet P to which the toner image is transferred by the secondary transfer roller 34, to fix the toner image on the surface of the sheet P to the sheet P.

On the downstream side of the fixing unit 44 in the conveying direction D, a conveying path switching unit 48 is provided for switching a conveying path of the sheet P to a sheet ejection path side or an ADU 60 side. The conveying path switching unit 48 performs conveying path switching control on the basis of a selected printing mode (single-sided printing mode, double-sided printing mode, and the like).

The sheet P on which single-sided printing is completed in the single-sided printing mode, or the sheet P on which double-sided printing is completed in the double-sided printing mode is ejected onto a sheet ejection tray by the sheet ejection roller 46.

In a case where an image is formed on the back surface side of the sheet P in the double-sided printing mode, the sheet P on which an image is formed on the front surface side is conveyed to the ADU 60 via a conveying roller 62 and the like. In a switchback path of the ADU 60, the sheet P is conveyed with its rear end as the head to a U-turn path portion by reverse rotation control of an ADU roller 64, and is re-fed to the secondary transfer roller 34 in a state in which the front and back surfaces are reversed by conveying rollers 66, 68, 70, 72, and the like provided in the U-turn path portion.

The driving mechanism 200 is a mechanism for rotationally driving the conveying rollers 66, 68, 70, and 72 surrounded by the broken line in FIG. 1 by execution of assist control and brake control. Details of the driving mechanism 200 will be described later.

Configuration Example of Driving Mechanism 200

Figure 2:
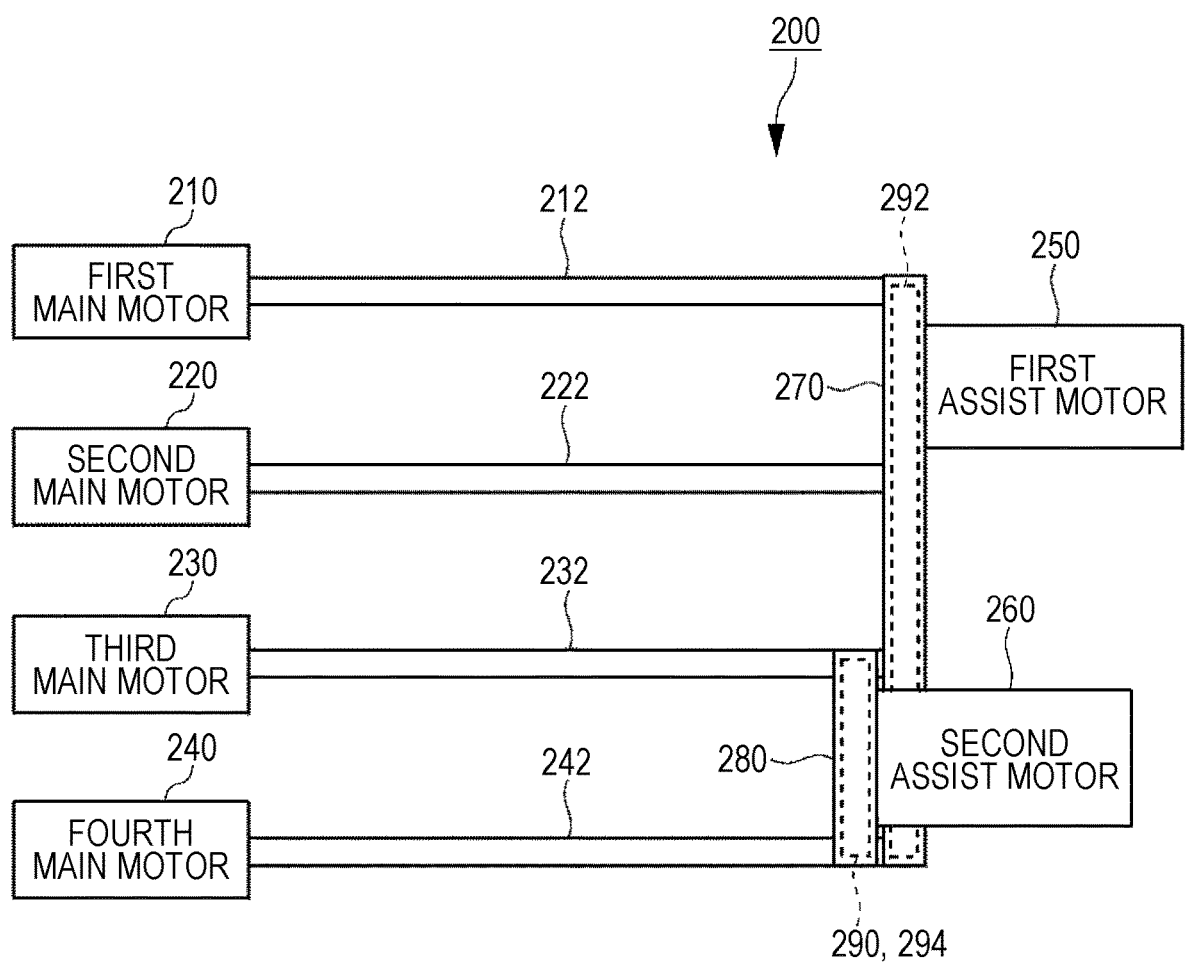
FIG. 2 is a diagram illustrating a configuration example of a driving mechanism.

FIG. 2 illustrates an example of a configuration of the driving mechanism 200. As illustrated in FIG. 2, the driving mechanism 200 includes a first main motor 210, a second main motor 220, a third main motor 230, and a fourth main motor 240.

The first main motor 210 is connected to one end of a rotating shaft 212 to which the conveying roller 66 illustrated in FIG. 1 is attached, via a gear and the like (not illustrated), and rotationally drives the conveying roller 66. Since the conveying roller 66 is provided on a path having a large bending rate of the ADU 60, a stepping motor having a large driving torque is used for the first main motor 210. For example, the torque of the first main motor 210 at a predetermined number of revolutions is 200 mN·m, and the output is 30 W.

The second main motor 220 is connected to one end of a rotating shaft 222 to which the conveying roller 72 illustrated in FIG. 1 is attached, via a gear and the like (not illustrated), and rotationally drives the conveying roller 72. Since the conveying roller 72 is provided on a path having a large bending rate of the ADU 60, a stepping motor having a large driving torque is used for the second main motor 220. For example, the torque of the second main motor 220 at a predetermined number of revolutions is 200 mN·m, and the output is 30 W.

The third main motor 230 is connected to one end of a rotating shaft 232 to which the conveying roller 68 illustrated in FIG. 1 is attached, via a gear and the like (not illustrated), and rotationally drives the conveying roller 68. Since the conveying roller 68 is provided on a path having a small bending rate of the ADU 60, a stepping motor having a small driving torque is used for the third main motor 230. For example, the torque of the third main motor 230 at a predetermined number of revolutions is 100 mN·m, and the output is 10 W.

The fourth main motor 240 is connected to one end of a rotating shaft 242 to which the conveying roller 70 illustrated in FIG. 1 is attached, via a gear and the like (not illustrated), and rotationally drives the conveying roller 70. Since the conveying roller 70 is provided on a path having a small bending rate of the ADU 60, a stepping motor having a small driving torque is used for the fourth main motor 240. For example, the torque of the fourth main motor 240 at a predetermined number of revolutions is 100 mN·m, and the output is 10 W.

The driving mechanism 200 also includes a first assist motor 250 in addition to the first main motor 210 and the like. The first assist motor 250 is a motor for assisting driving of the first main motor 210 and the like that cause torque shortages during high-speed rotation. The first assist motor 250 is connected, via a transmission unit 270 including a plurality of gears, to each of the other end of the rotating shaft 212 for the first main motor 210, the other end of the rotating shaft 222 for the second main motor 220, the other end of the rotating shaft 232 for the third main motor 230, and the other end of the rotating shaft 242 for the fourth main motor 240. The first assist motor 250 applies torque for assisting (hereinafter referred to as assist torque) as first torque to the first main motor 210, the second main motor 220, the third main motor 230, and the fourth main motor 240 (hereinafter referred to as the first main motor 210 and the like). As a result, since the same amount of torque can be applied at the same timing to the first main motor 210 and the like, torque shortages during high-speed rotation and the like can be avoided while variations in the amount of torque are eliminated among the first main motor 210 and the like. The first assist motor 250 includes a DC brushless motor, and for example, its torque is from −50 to 100 mN·m, and the output is 20 W.

The driving mechanism 200 also includes a second assist motor 260 in addition to the first main motor 210 and the like. As described above, inertia and a conveying load (motor type, rotating shaft load) may differ between the rotating shafts 212, 222, 232, and 242. Specifically, the output torque of each of the third main motor 230 and the fourth main motor 240 is smaller than the output torque of each of the first main motor 210 and the second main motor 220. For that reason, when the same amount of assist torque is applied by the first assist motor 250 to all the motors such as the first main motor 210, torque is excessively applied to the third main motor 230 and the fourth main motor 240, which may cause step-out. Therefore, in the present embodiment, the second assist motor 260 is provided for adjusting (suppressing) the assist torque excessively applied to the third main motor 230 and the fourth main motor 240.

The second assist motor 260 is connected, via a transmission unit 280 including a plurality of gears, to each of the other end of the rotating shaft 232 for the third main motor 230, and the other end of the rotating shaft 242 for the fourth main motor 240. The second assist motor 260 applies torque for braking (hereinafter referred to as brake torque) as second torque for reducing the assist torque applied by the first assist motor 250 by a predetermined amount to each of the third main motor 230 and the fourth main motor 240 synchronously. As a result, the same amount of brake torque can be applied at the same timing to the third main motor 230 and the fourth main motor 240. The second assist motor 260 includes a DC brushless motor, and for example, its torque is from −50 to 100 mN·m, and the output is 20 W.

Block Configuration Example of Image Forming Apparatus 100

Figure 3:
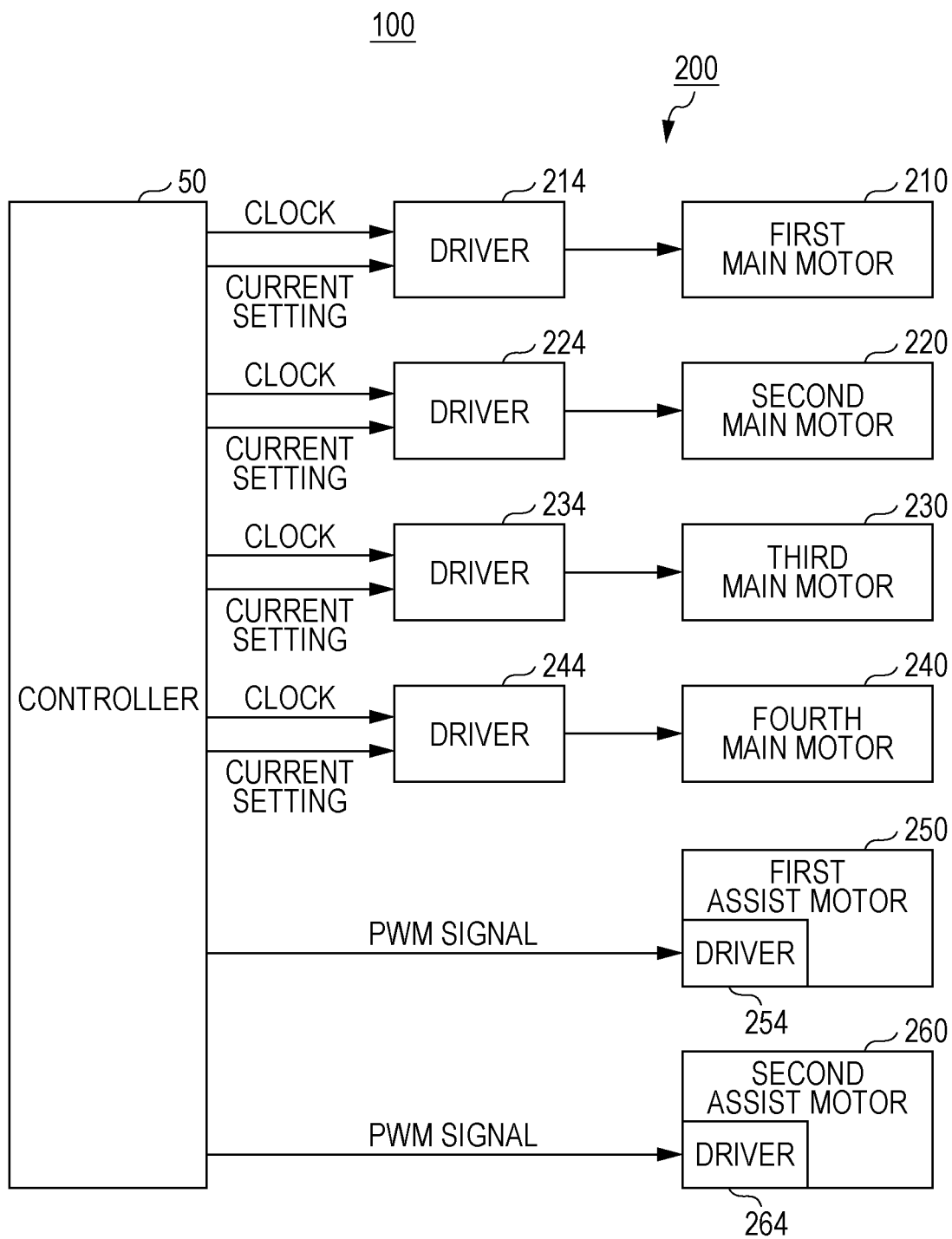
FIG. 3 is a block diagram illustrating an example of a functional configuration of the image forming apparatus.

FIG. 3 is a block diagram illustrating an example of a functional configuration of the image forming apparatus 100. As illustrated in FIG. 3, the image forming apparatus 100 includes a controller 50 for controlling operation of the entire apparatus including the driving mechanism 200. The controller 50 includes, for example, a Central Processing Unit (CPU) and Read Only Memory (ROM). The CPU executes software (program) read from the ROM, to implement image forming processing including assist control and brake control of the first main motor 210 and the like.

The controller 50 is connected to each of a driver 214 for the first main motor 210, a driver 224 for the second main motor 220, a driver 234 for the third main motor 230, a driver 244 for the fourth main motor 240, a driver 254 for the first assist motor 250, and a driver 264 for the second assist motor 260.

The driver 214 for the first main motor 210 determines an amount of current on the basis of a clock frequency and current setting information supplied from the controller 50, and supplies the determined current to the first main motor 210. The first main motor 210 is driven on the basis of the current supplied from the driver 214, and rotates the conveying roller 66 via the rotating shaft 212.

The driver 224 for the second main motor 220 determines an amount of current on the basis of a clock frequency and current setting information supplied from the controller 50, and supplies the determined current to the second main motor 220. The second main motor 220 is driven on the basis of the current supplied from the driver 224, and rotates the conveying roller 72 via the rotating shaft 222.

The driver 234 for the third main motor 230 determines an amount of current on the basis of a clock frequency and current setting information supplied from the controller 50, and supplies the determined current to the third main motor 230. The third main motor 230 is driven on the basis of the current supplied from the driver 234, and rotates the conveying roller 68 via the rotating shaft 232.

The driver 244 for the fourth main motor 240 determines an amount of current on the basis of a clock frequency and current setting information supplied from the controller 50, and supplies the determined current to the fourth main motor 240. The fourth main motor 240 is driven on the basis of the current supplied from the driver 244, and rotates the conveying roller 70 via the rotating shaft 242.

The driver 254 for the first assist motor 250 is integrated with the first assist motor 250, determines an amount of current on the basis of a PWM signal supplied from the controller 50, and supplies the determined current to the first assist motor 250. The first assist motor 250 is driven on the basis of the current supplied from the driver 254 and applies assist torque for a shortfall to the first main motor 210 and the like.

The driver 264 for the second assist motor 260 is integrated with the second assist motor 260, determines an amount of current on the basis of a PWM signal supplied from the controller 50, and supplies the determined current to the second assist motor 260.

The second assist motor 260 is driven on the basis of the current supplied from the driver 264, and applies torque to the first main motor 210 and the like. In a case where a duty ratio of the PWM signal supplied to the second assist motor 260 is 50% or more, generated torque functions as the assist torque. In a case where the duty ratio of the PWM signal supplied to the second assist motor 260 is less than 50%, the generated torque functions as brake torque.

As illustrated in FIG. 2, as the configuration of the driving mechanism 200, a clutch 290 can be provided that is indicated by a broken line and is connected to the second assist motor 260. In a case where the second assist motor 260 is not driven, the controller 50 controls the clutch 290 to release the connection with the rotating shafts 232 and 242 and to cut off the torque transmitted to the second assist motor 260.

Example of Change in Acceleration of Main Motor

Figure 4:
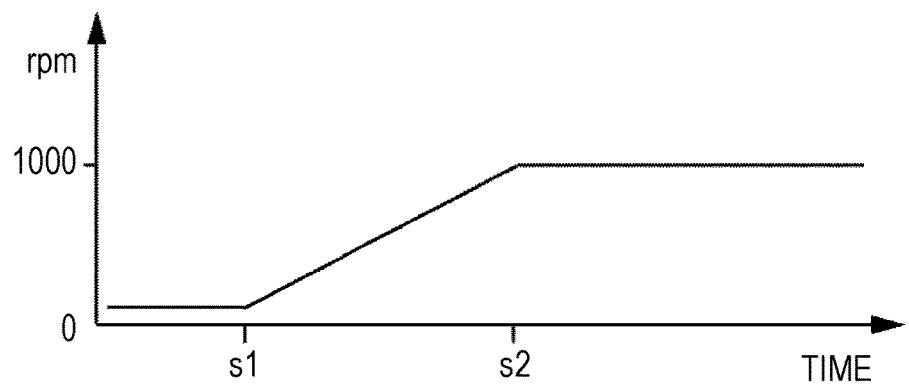
FIG. 4 is a diagram for explaining a change in acceleration of a first main motor during image formation.

FIG. 4 is a diagram for explaining a change in the acceleration of the first main motor 210 during image formation. In FIG. 4, the vertical axis represents the number of revolutions of the first main motor 210, and the horizontal axis represents time.

As illustrated in FIG. 4, when a shift instruction is issued from the controller 50 at time s1, the number of revolutions (rotation speed) of the first main motor 210 increases, and along with this, the acceleration also rises and its slope becomes large. When a constant speed instruction is issued from the controller 50 at time s2, the number of revolutions of the first main motor 210 is maintained at 1000 rpm, and along with this, the acceleration is also maintained at a constant value.

Although only the first main motor 210 has been described in FIG. 4, the acceleration of each of the second main motor 220, the third main motor 230, and the fourth main motor 240 also changes at substantially the same acceleration as that of the first main motor 210.

About Upper Limit Value UL and Lower Limit Value LL of Assist Torque

Figure 5:
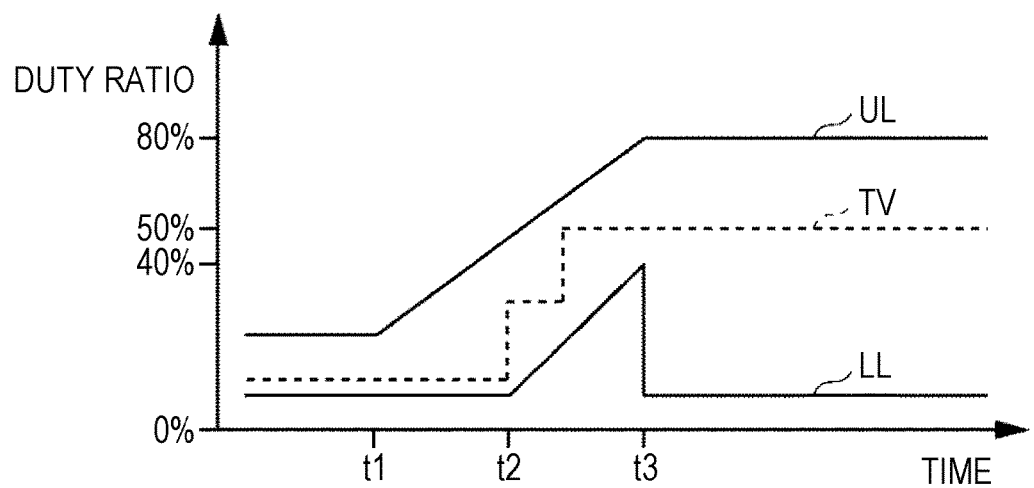
FIG. 5 is a diagram for explaining an upper limit value and a lower limit value of assist torque.

FIG. 5 is a diagram for explaining an upper limit value UL and a lower limit value LL of the assist torque of the first assist motor 250. In FIG. 5, the vertical axis represents the duty ratio of the PWM signal of the first assist motor 250, and the horizontal axis represents time.

At each number of revolutions of the first main motor 210, an upper limit value UL and a lower limit value LL are set for the assist torque that can be applied by the first assist motor 250. This is because in a case where the duty ratio of the first assist motor 250 exceeds the upper limit value UL, an excessive assist torque is applied to the first main motor 210 and the like, and the first main motor 210 and the like are excessively rotated and the motors cannot be synchronized with each other, which may cause step-out. In addition, this is because in a case where the duty ratio of the first assist motor 250 is less than the lower limit value LL, step-out may occur between the motors due to torque shortages.

As illustrated in FIG. 5, the upper limit value UL is set in accordance with the acceleration curve of the first main motor 210 illustrated in FIG. 4, and is set such that the duty ratio gradually increases from time t1 (corresponding to time s1 in FIG. 4) to time t3 (corresponding to time s2 in FIG. 4), and the duty ratio is set to a constant after time t3. The lower limit value LL is set such that the duty ratio is lower than the upper limit value UL and gradually increases from time t2 to time t3 between which the number of revolutions of the first main motor 210 is further increased, and after time t3, the duty ratio is set to substantially the same value as before the time t2.

Therefore, in the present embodiment, a target value TV of the duty ratio of the first assist motor 250 is set to be a value between the upper limit value UL and the lower limit value LL. The target value TV can be set to different values for each of the motor type, loads of the rotating shaft and the sheet P (inertia of the rotating shaft 212 or the like, and conveying load).

As for the second assist motor 260, similarly to the first assist motor 250, the upper limit value UL and the lower limit value LL can be set for the duty ratio. As a result, problems can be prevented caused by excessive braking by the second assist motor 260. Torque limiters 292 and 294 indicated by broken lines may be respectively provided in the transmission units 270 and 280 illustrated in FIG. 2. By setting the set torque of each of the torque limiters 292 and 294 to the upper limit value UL, it is possible to cut off connection between the motors to shut off torque transmission when an overload is applied to the first main motor 210 and the like.

Example of Assist Control of Third Main Motor 230 and the Like

Figure 6:
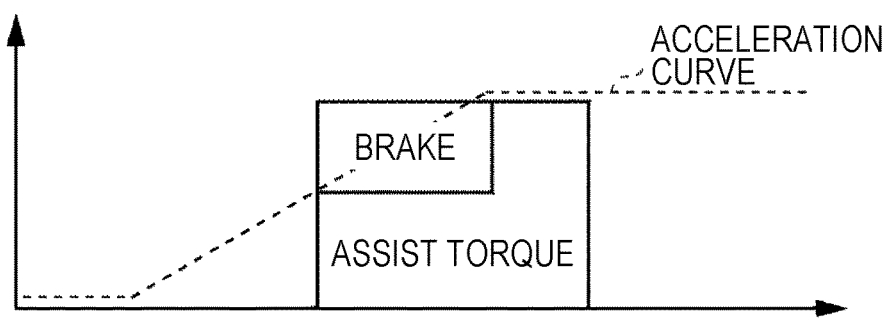
FIG. 6 is an image diagram in a case where assist control is performed of a third main motor or the like having a small output torque.

FIG. 6 is an image diagram in a case where assist control is performed of the third main motor 230 and the fourth main motor 240 (hereinafter may be referred to as the third main motor 230 and the like) each having a small output torque in the driving mechanism 200 illustrated in FIG. 2. In FIG. 6, the broken line indicates an acceleration curve when the first main motor 210 and the like are driven.

As illustrated in FIG. 6, when the acceleration of each of the first main motor 210 and the like rises, the first assist motor 250 is driven, and the assist torque is applied to the third main motor 230 and the like. The third main motor 230 and the like are small torque (small size) motors, and when the assist torque is applied by the first assist motor 250, the entire torque becomes excessive. For that reason, in addition to assist control by the first assist motor 250, the second assist motor 260 is driven from the rise of the acceleration of each of the third main motor 230 and the like to a predetermined number of revolutions (predetermined frequency), and applies the brake to the third main motor 230 and the like. Thus, the assist torque by the first assist motor 250 is reduced by the brake torque by the second assist motor 260. As a result, in the third main motor 230 and the like, an assist amount suitable for the motor size is applied, so that step-out can be reliably prevented.

On the other hand, in the case of the first main motor 210 and the like, the torque is large (large size), and the assist torque by the first assist motor 250 does not become excessive torque. For that reason, brake control by the first assist motor 250 is not executed.

Operation Example of Image Forming Apparatus 100

Figure 7:
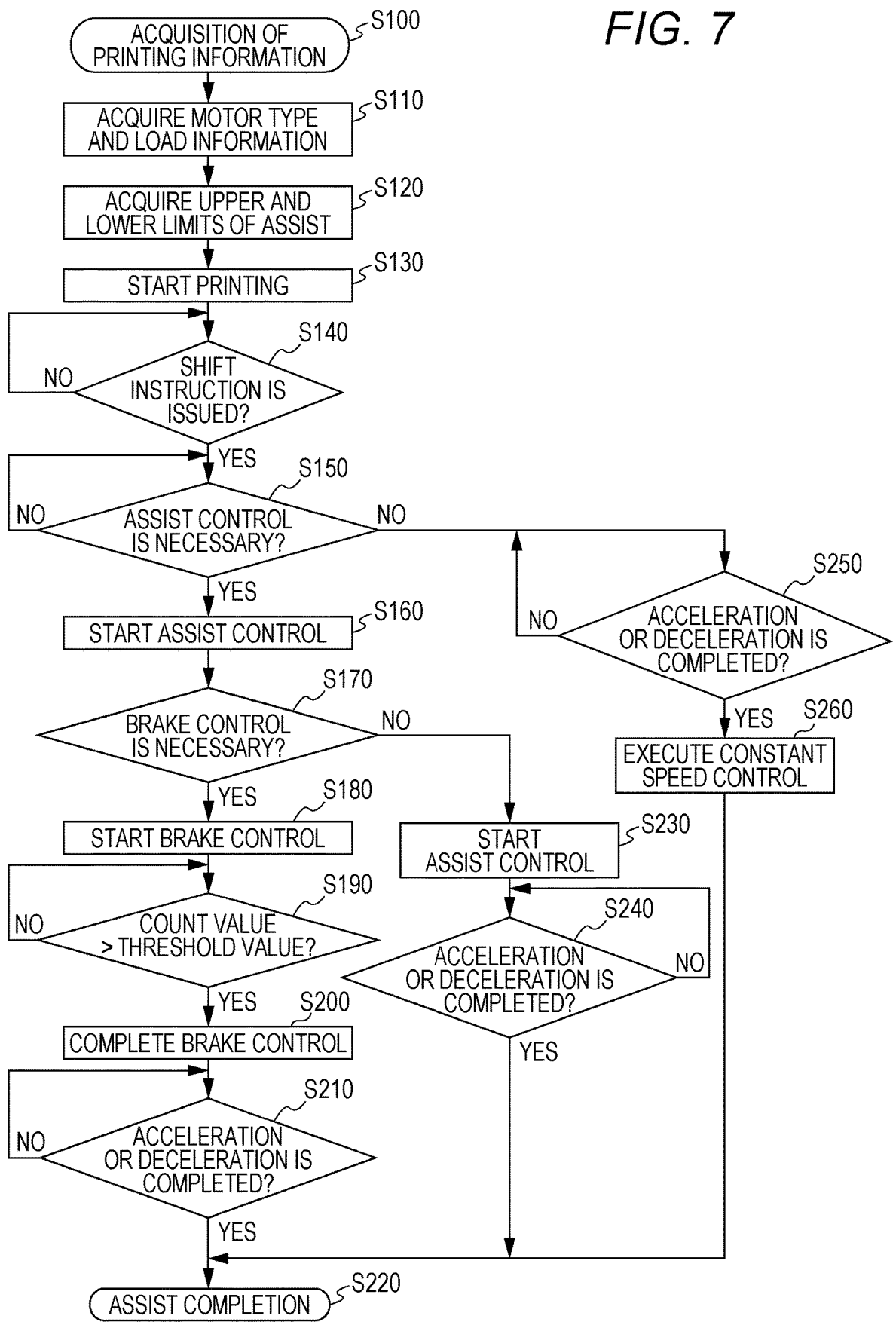
FIG. 7 is a flowchart illustrating an operation example of the image forming apparatus.

FIG. 7 is a flowchart illustrating an example of operation of the image forming apparatus 100. The controller 50 executes programs and job data read from memory such as the ROM, to implement the processing illustrated in the flowchart of FIG. 7. Hereinafter, at least one or more of the first main motor 210, the second main motor 220, the third main motor 230, and the fourth main motor 240 will be referred to as a main motor.

As illustrated in FIG. 7, in step S100, the controller 50 acquires printing information (image forming condition information) including the type of sheet, basis weight, and the like from the job information. Upon completion of step S100, the processing proceeds to step S110.

In step S110, the controller 50 acquires motor type information and load information. Examples of the motor type information include information such as the output torque of the motor. Examples of the load information include information such as the load of the conveying roller or the rotating shaft, and the thickness and basis weight of the sheet. The motor type information and the like may be stored in the memory in advance, or a user may input from the operation display unit 82. Upon completion of step S110, the processing proceeds to step S120.

In step S120, the controller 50 acquires each of the upper limit value UL and the lower limit value LL of the assist torque set for each motor type and load. The upper limit value UL and the lower limit value LL of the assist torque can be calculated on the basis of the linear velocity of the job, the motor type information, and the load information. Upon completion of step S120, the processing proceeds to step S130.

In step S130, the controller 50 starts printing on the basis of a job accepted from a computer or the like. Along with this, rotational driving is started of the main motor and the like. When printing is started in step S130, the processing proceeds to step S140.

In step S140, the controller 50 determines whether or not the shift instruction is issued. In a case where it is determined that the shift instruction is not issued, the controller 50 continues a monitoring state until the shift instruction is issued. On the other hand, in a case where the controller 50 determines that the shift instruction is issued, the processing proceeds to step S150.

In step S150, the controller 50 determines whether or not assist control for the main motor is necessary. For example, the controller 50 determines whether or not the assist control for the main motor is necessary, from the number of revolutions and acceleration curve of the main motor set on the basis of the linear velocity (between sheets), the thickness of the sheet P, and the like. In a case where the controller 50 determines that the assist control is necessary, the processing proceeds to step S160.

In step S160, the controller 50 drives the first assist motor 250 on the basis of the target value TV to start the assist control. As a result, the same amount of assist torque can be applied to the main motors that have torque shortages on the whole. Upon completion of step S160, the processing proceeds to step S170.

In step S170, the controller 50 determines whether or not brake control is necessary. That is, it is determined whether or not there is a main motor whose torque is equal to or larger than a specified value (over torque) by the assist control. The controller 50 determines whether or not the brake control is necessary on the basis of information such as the linear velocity of the job, the load such as sheet type, and the magnitude of output torque of the main motor. In a case where the controller 50 determines that the brake control is necessary, the processing proceeds to step S180.

In step S180, the controller 50 drives the second assist motor 260 to start the brake control. In the brake control, the amount of torque to be applied to the main motor is controlled by the second assist motor 260 in accordance with the number of revolutions of the main motor. As a result, the brake can be applied to the main motor where the torque is excessive due to application of the assist torque. Upon completion of step S180, the processing proceeds to step S190.

In step S190, the controller 50 determines whether or not a count value of the clock frequency (number of revolutions) of each of the first main motor 210 and the like exceeds a threshold value set in advance. Whether or not to terminate the brake control may be determined on the basis of a timer count value from the time of startup of the first main motor 210 and the like. In a case where it is determined that the count value does not exceed the threshold value, the controller 50 continuously monitors the count value. On the other hand, in a case where the controller 50 determines that the count value exceeds the threshold value, the processing proceeds to step S200.

In step S200, the controller 50 stops driving the second assist motor 260, and terminates the brake control. Upon completion of step S200, the processing proceeds to step S210.

In step S210, the controller 50 determines whether or not acceleration or deceleration of the main motor is completed. When it is determined that the acceleration or deceleration of the main motor is not completed, the controller 50 continuously performs monitoring until the acceleration or deceleration of the main motor is completed. On the other hand, in a case where the controller 50 determines that the acceleration or deceleration of the main motor is completed, the processing proceeds to step S220.

In step S220, the controller 50 stops driving the first assist motor 250 to complete the assist control.

In step S170, in a case where the controller 50 determines that the assist control is necessary and the brake control is not necessary, the processing proceeds to step S230.

In step S230, the controller 50 drives the first assist motor 250 to start the assist control. As a result, assist torque can be applied to each of the main motors that have torque shortages on the whole. Upon completion of step S230, the processing proceeds to step S240.

In step S240, the controller 50 determines whether or not the acceleration or deceleration of the main motor is completed. When it is determined that the acceleration or deceleration of the main motor is not completed, the controller 50 continuously performs monitoring until the acceleration or deceleration of the main motor is completed. On the other hand, in a case where the controller 50 determines that the acceleration or deceleration of the main motor is completed, the processing proceeds to step S220.

On the other hand, in step S150 described above, in a case where the controller 50 determines that the assist control for the main motor is not necessary, the processing proceeds to step S250.

In step S250, the controller 50 determines whether or not the acceleration or deceleration of the main motor is completed. When it is determined that the acceleration or deceleration of the main motor is not completed, the controller 50 continuously performs monitoring until the acceleration or deceleration of the main motor is completed. On the other hand, in a case where the controller 50 determines that the acceleration or deceleration of the main motor is completed, the processing proceeds to step S260.

In step S260, the controller 50 controls the main motor to execute constant speed control. In the present embodiment, such processing is repeatedly executed.

As described above, according to the present embodiment, even in a case where excessive assist torque is applied by the first assist motor 250 to the third main motor 230 and the fourth main motor 240 each having a small driving torque, the assist torque can be reduced by the brake control by the second assist motor 260. As a result, the torque of each of the third main motor 230 and the fourth main motor 240 can be suppressed within the specified value, so that step-out of the motor can be reliably prevented.

According to the present embodiment, the controller 50 executes the assist control and the brake control on the basis of information such as the motor type (characteristic), and the loads of the rotating shaft and the sheet P, so that step-out of the motor can be reliably prevented. In addition, according to the present embodiment, a long sheet P extending over a plurality of conveying rollers can be conveyed with high accuracy.

The technical scope of the present invention is not limited to the above-described embodiment, but includes various modifications to the above-described embodiment without departing from the spirit of the present invention.

In the above-described embodiment, the second assist motor 260 is used as a brake motor; however, not limited thereto, the second assist motor 260 can be used as an assist motor. In this case, the assist control by the first assist motor 250 is executed in accordance with the third main motor 230 and the fourth main motor 240 each having a small driving torque. For that reason, torque is insufficient for the necessary amount in the first main motor 210 and the second main motor 220. Therefore, as a modification of the driving mechanism 200 in FIG. 2, the second assist motor 260 is connected to each of the first main motor 210 and the second main motor 220 and the second assist motor 260 is driven, whereby assist torque for a shortfall is applied to each of the first main motor 210 and the second main motor 220.

In the above-described embodiment, an example has been described in which the driving mechanism 200 is applied to the ADU 60 of the image forming apparatus 100; however, the present invention is not limited thereto. For example, the driving mechanism 200 can be applied to another conveying path other than the ADU 60 of the image forming apparatus 100. Further, the driving mechanism 200 can be applied to a large capacity sheet feeding apparatus connected, at the upstream side in the conveying direction D, to the image forming apparatus 100, and the driving mechanism 200 can also be applied to the post processing apparatus connected, at the downstream side in the conveying direction D, to the image forming apparatus 100.

In the above-described embodiment, an example has been described in which DC brushless motors are used as the first assist motor 250 and the second assist motor 260; however, the present invention is not limited thereto. For example, a DC motor with brush can be used.

Further, the processing described with reference to the flowchart and the sequence diagram in this specification need not necessarily be executed in the order illustrated. Some processing steps may be executed in parallel. Furthermore, additional processing steps may be employed and some processing steps may be omitted.

Although embodiments of the present invention have been described and illustrated in detail, the disclosed embodiments are made for purposes of illustration and example only and not limitation. The scope of the present invention should be interpreted by terms of the appended claims.

What is claimed is:

1. A sheet conveying apparatus comprising:
   a plurality of motors each connected to one end of a corresponding one of a respective plurality of rotating shafts;
   a first torque adjuster connected to another end of each of the plurality of rotating shafts, the first torque adjuster applying a first torque to the plurality of rotating shafts;
   a second torque adjuster that applies, to the rotating shafts connected to a subset of the plurality of motors, a second torque while the first torque adjuster applies the first torque to the plurality of rotating shafts; and
   a hardware processor that controls the second torque adjuster in applying the second torque, the control by the hardware processor performed in accordance with a number of revolutions of the subset of the plurality of motors.

2. The sheet conveying apparatus according to claim 1, wherein
   each one of the plurality of stepping motors is a stepping motor, and
   the second torque adjuster is a DC motor.

3. The sheet conveying apparatus according to claim 1, wherein
   the first torque adjuster and the second torque adjuster are connected to at least one or more of the plurality of motors.

4. The sheet conveying apparatus according to claim 1, wherein
   inertia and a conveying load differ between the plurality of rotating shafts.

5. The sheet conveying apparatus according to claim 1, further comprising
   a torque limiter provided on at least one of the first torque adjuster and the second torque adjuster, the torque limiter setting an upper limit value of at least one of the first torque and the second torque.

6. The sheet conveying apparatus according to claim 1, further comprising a clutch connected to the second torque adjuster, wherein the hardware processor is configured to control the clutch to release connections of the second torque adjuster with the rotating shafts.

* * * * *